NELSON BURR.

Improvement in Grinding Mills.

No. 4,740.

Reissued Feb. 6, 1872.

Witnesses.

P. S. Dennis

R. D. O. Smith

Inventor.

Nelson Burr by Lewis L. Cutbrow

Atty.

UNITED STATES PATENT OFFICE.

NELSON BURR, OF BATAVIA, ILLINOIS.

IMPROVEMENT IN GRINDING-MILLS.

Specification forming part of Letters Patent No. 94,072, dated August 24, 1869; reissue No. 4,740, dated February 6, 1872.

SPECIFICATION (B.)

*To all whom it may concern:*

Be it known that I, NELSON BURR, of Batavia, in the county of Kane and State of Illinois, have invented certain Improvements in Mills; and I do hereby declare that the following is a full, clear, and exact description thereof, reference being had to the accompanying drawing and to the letters of reference marked thereon which form part of this specification, in which—

Figure 1:
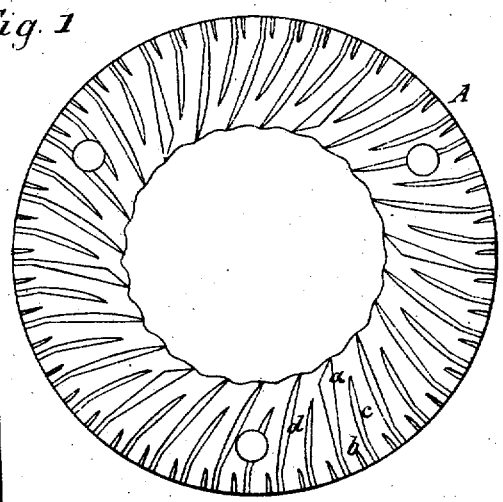
Figure 3:
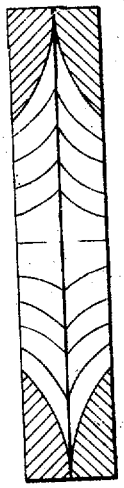
Figure 2:
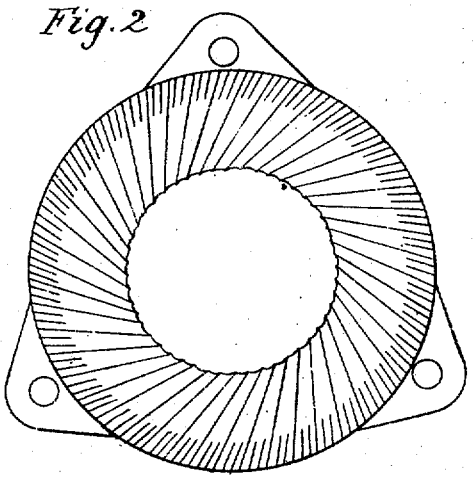

Figure 1 represents the grinding surface of the ring or disk. Fig. 2 represents the same form of grinding-surface with Fig. 1, but on a reduced scale. Fig. 3 is a central vertical section of the ring or disk.

The nature of my invention consists in the peculiar construction and dressing of cast-iron rings or disks so as to adapt them for grinding corn or other grain, as set forth.

A represents a cast-iron disk or ring, an inch, more or less, in width on its face and curved downward from near the outer to the inner circumference. This curved surface is furnished with five distinct series of grinding-ridges. The first series, marked *a*, is plane on the grinding side, slightly convex on the opposite side, and nearly horizontal at its upper edge. The second series consists of ridges *b*, which extend from the periphery of A inward a quarter of an inch, more or less. The third series *c* extends from the periphery of the disk to more than half of its width. The fourth series *d* extends from the outer to the inner circumference of the disk A. The fifth series, marked *e*, has the same length and prominency with *a*, but is slightly curved at its upper edge. These several series of ridges form both the drift and the grinding parts of the mill. The long ridges extending in toward the center form the drift, while the short ridges form the grinding-surface. It will be seen that the long ridges extend to the outer circumference, so that the ridges are all even at the periphery. By this form of construction I am enabled to cast the whole drift and grinding-surface at one and the same time.

I do not limit myself to the peculiar form of drift and grinding-ridges shown, as such form may be varied, although I deem it the best.

What I claim, and desire to secure by Letters Patent, is—

1. The combination of the two similar annular grinding-disks here shown, each provided with a grinding-surface at the outer edge and a drift or feeding-ridges at the inner edge, substantially as set forth and shown.

2. The combination of the two similar grinding-disks here shown, each provided with the long ridges *a* and *d* and the intervening shorter ridges *b* and *c*, all constructed and arranged as herein set forth.

NELSON BURR.

Witnesess:
W. D. NICHOLS,
GEO. G. LYON.